March 25, 1930.  E. GUGGENHEIM ET AL  1,751,628
MEAT TENDERER
Filed March 11, 1927  2 Sheets-Sheet 1
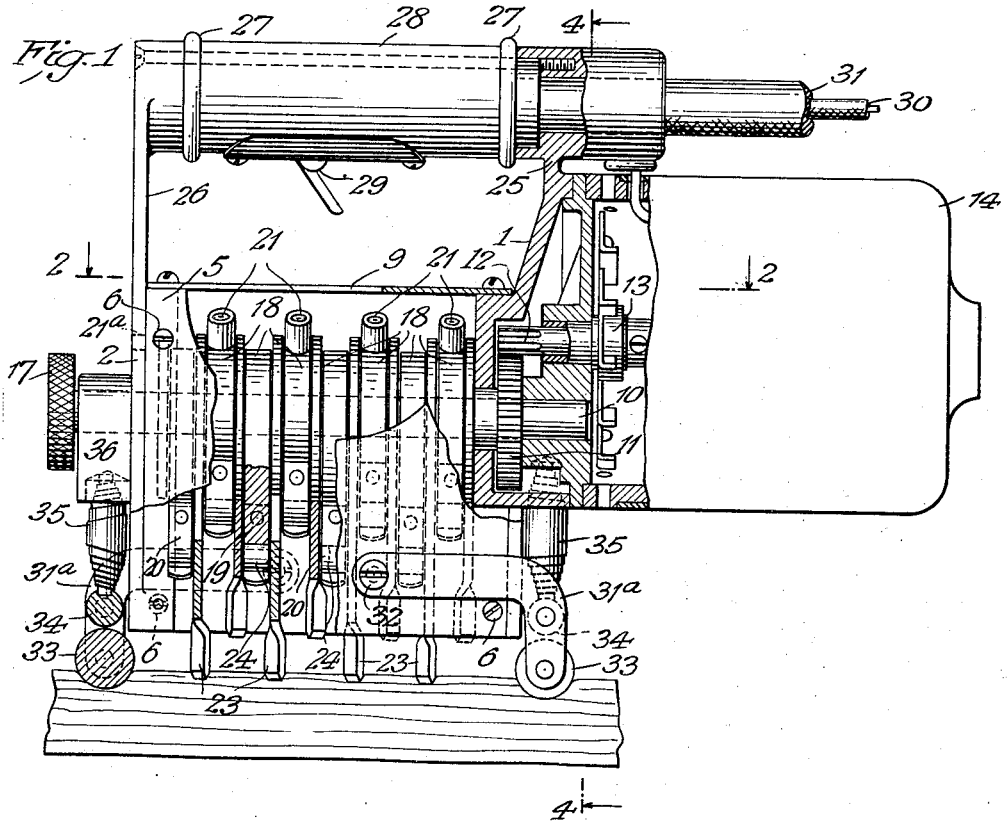
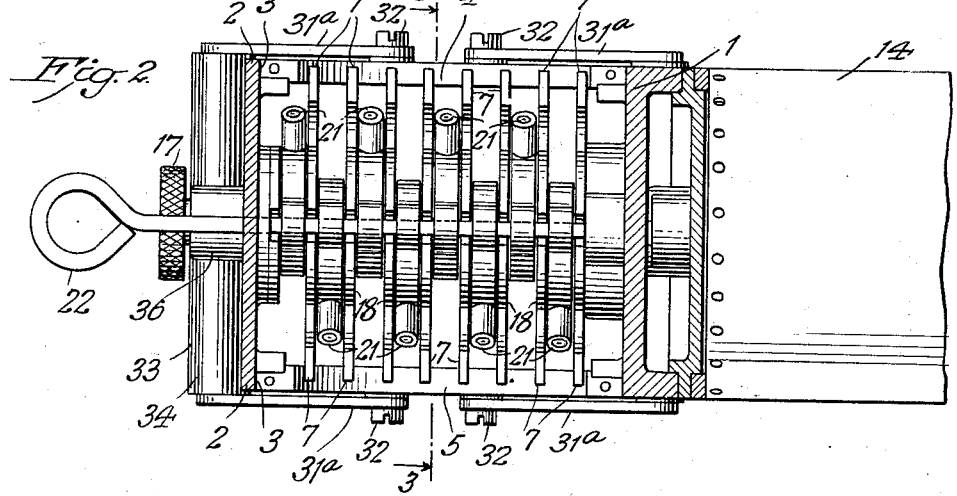
INVENTORS
Ezekiel Guggenheim & Herbert W. Spellman
BY Victor D. Borst
ATTORNEY March 25, 1930.   E. GUGGENHEIM ET AL   1,751,628
MEAT TENDERER
Filed March 11, 1927   2 Sheets-Sheet 2
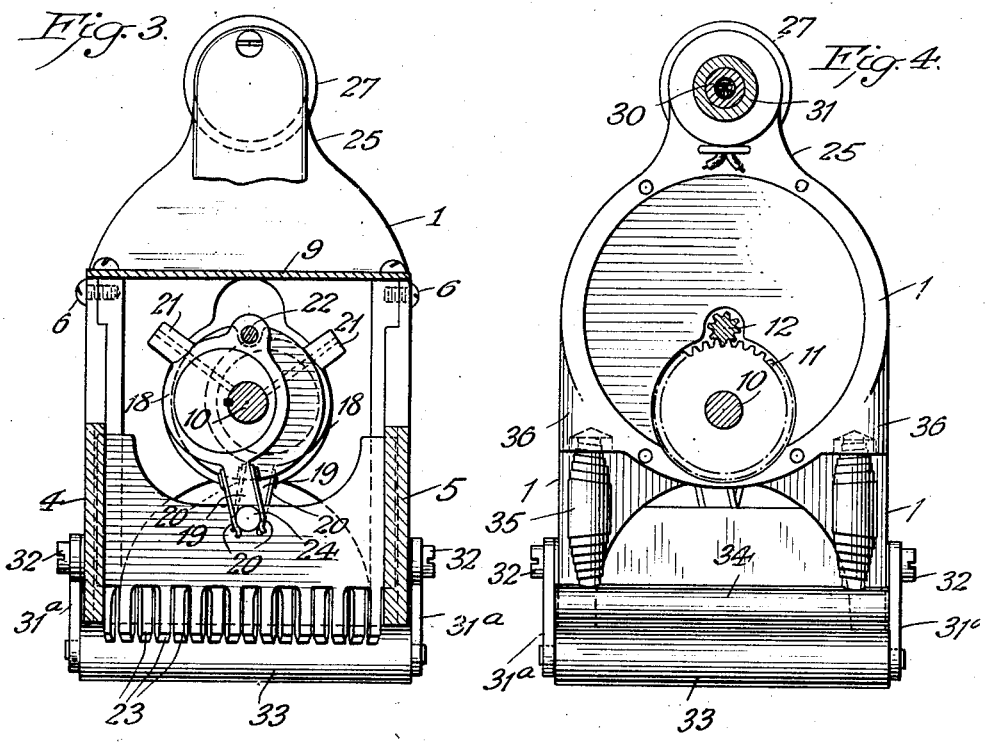
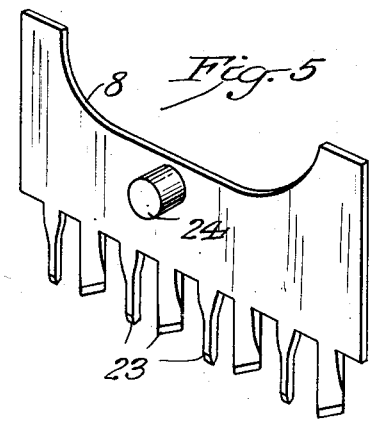
INVENTORS.
Ezekiel Guggenheim and Herbert W. Spellman
BY Victor D Borst
ATTORNEY Patented Mar. 25, 1930

1,751,628

UNITED STATES PATENT OFFICE

EZEKIEL GUGGENHEIM AND HERBERT W. SPELLMAN, OF MERIDEN, CONNECTICUT; SAID SPELLMAN ASSIGNOR TO SAID GUGGENHEIM

MEAT TENDERER

Application filed March 11, 1927. Serial No. 174,660.

This invention relates to meat tendering devices and particularly to the type disclosed in U. S. Letters Patent #1,500,811, of July 8, 1924. By the use of machines of this nature the cheaper cuts of meat may be treated to approach the qualities of the more expensive cuts in both texture and flavor. Devices of this kind, by cutting and exposing the fibers, permit the meat to be cooked more quickly, uniformly and thoroughly.

It is the purpose of this invention to improve the machine described in the prior patent and produce a machine that is simpler, easier to operate and more thorough and complete in its operation. These desired results are obtained by making a unitary and complete machine, and by constructing the assembly so that the cutters are removable that is readily detachable for cleansing and replacing without disassembling the machine. The operation of the device is made more effective by arranging the cutting blades at various angles as well as staggering the adjacent rows. A locking device is provided for locking the cutters from movement when so desired.

Other improvements in the structure and operation will be apparent from a consideration of the following description taken in consideration with the drawings, in which:

Fig. 1 is a side elevation partly cut away and in section of a machine embodying this invention;

Fig. 2 is a section on line 2—2 of Fig. 1;

Fig. 3 is a section on line 3—3 of Fig. 2, showing the releasable connection between the cutters and straps;

Fig. 4 is a section on line 4—4 of Fig. 1, and

Fig. 5 is a perspective detail of one of the cutters and its blades.

In the embodiment of this invention as illustrated in the drawings, there is shown a frame composed of a rear end plate 1 and an opposite front end plate 2 preferably formed of cast metal or otherwise made of sturdy construction. These end plates 1 and 2 are provided with angular grooves 3 along their extreme internal edges into which are secured side plates 4 and 5 by means of bolts 6 or the like, these side plates serving to hold the end plates in spaced parallel relationship. The side plates are provided with vertical parallel slots or grooves 7 of a width equal to the thickness of the cutters upon their inner surfaces which serve as guides for guiding and restraining the reciprocating cutter blades 8, to be later described in detail. A guard plate 9 is secured across the tops of the side plates 4 and 5 to cover the entire area to prevent unintentional contact with the mechanism therebelow. Journaled in bearings formed in the end plates 1 and 2 is a main driving shaft 10 having a gear 11 secured to one end thereof, which gear is actuated by gear teeth 12 cut upon the end of a projecting shaft 13 of a small enclosed portable electric motor 14 supported upon the rear end plate 1. The main driving shaft 10 carries eccentric cams 15 suitably secured to the shaft 10 in spaced relationship with the throws alternately on opposite sides thereof. These eccentrics 15 may be secured to the shaft 10 by any suitable means, such as a key 16 to be rotatably driven by the shaft 10 and to thereby reciprocate the cutters 8 in the grooves 7 provided on the opposite and inner faces of the side plates 4 and 5. Shaft 10 is provided upon its opposite end from that which carries the gear 11 with a knurled nut 17 by which the shaft may be manually rotated. The eccentrics 15 are surrounded by eccentric straps 18 which are formed with projecting fingers 19 concaved upon the end. Leaf springs 20 are riveted or otherwise secured to the projecting fingers 19 and extend slightly beyond the concaved end where they are bent inwardly. The straps are formed with projecting oilers 21 on the upper portions thereof and the straps are arranged on the shaft so that the oilers on adjacent straps project on alternate sides. The straps also have a hole formed therein positioned so that the holes are all in alignment when the concaved ends of the fingers 19 are all equally distant from the main shaft 10. A hole 21ª is also formed in the front end plate 2 in alignment with the holes in the straps so that a pin 22 may be inserted through the front end plate and through the holes in the straps, thereby locking the straps, eccentric cams and main shaft from rotation.

The cutters 8 are formed of steel plates and have formed upon one end thereof a series of narrow sharpened blades 23, the sharpened edges of which are angularly disposed relatively to each other. The blades of half the cutters are also staggered with respect to the other half of the cutters, that is, they are unequally distant from the edge of the cutter so that when the cutters are placed in adjacent grooves the blades 23 thereon will be angularly, as well as staggeredly disposed relatively to each other. Each cutter has a round pin 24 projecting from one side thereof near the upper edge, which pin is adapted to engage the concave end of a finger 19 projecting from the eccentric strap 18 and to be releasably held thereagainst by the springs 20. It can readily be seen that this structure results in a cutter which is readily removable or detachable for purposes of cleaning or sharpening, and therefore results in a very sanitary machine.

Extensions 25 and 26 on plates 1 and 2 respectively are formed integral with the end plates 1 and 2 and project above the motor and the frame proper to form end supports 27 for a hollow handle 28 by which the device is carried about or handled in use. Within the handle 28 is mounted a switch 29, preferably of the kind that normally maintains a circuit open unless a pressure is maintained by holding it against its normal position. This prevents unintentional operation of the motor and cutters with resulting injury or possibility of damage. The usual electric cable 30 surrounded by protector 31 extends into the interior of handle 28 to switch 29 and then to the motor 14 which serves for driving shaft 10 and cutters connected thereto.

The meat tenderer is supported as described in my previous patent so that it may be rolled over the surface to be operated upon and may be pressed into more or less intimate contact with the meat by pressure upon the top of the machine. For this purpose two bent arms 31ª, one extending rearwardly and one forwardly are pivoted to each of the side plates 4 and 5 at pivot points 32. The bent arms at each end carry rollers 33 between them which extend across the front and rear of the machine and full width thereof to form a support for the machine to hold it above the meat to be operated upon. Spacing or bracing rods 34 also extend between and are joined to the bent arms 31ª at each end to add rigidity to the structure. Stiff springs 35 are provided between outwardly projecting bosses 36 formed on each of the end plates 1 and 2 and the spacing rods 34 to resiliently support the weight of the entire device so that the cutters, even with the eccentrics at their maximum throw, will not penetrate the surface beneath them unless pressure is exerted upon handle 28 of the machine to compress springs 35 and swing arms 31ª about their pivots 32. Two such springs are provided at the motor end of the machine and one at the front end.

The operation of the device is substantially the same as in our prior patent, that is the meat tenderer is placed over the steak or other piece of meat to be operated upon, and pressure of the finger is brought to bear against the switch which starts the motor. Rotation of motor 14 causing rotation of shaft 10 geared thereto causes rapid reciprocation of all the cutters 8 so that when pressure is exerted on handle 28 of the machine the blades of the cutters will enter the meat and sever and expose the fibers. The device may be rolled slowly back and forth over the meat in question until the desired condition of perfection of tenderness is attained. It is obvious that the operator may obtain any desired degree of penetration by regulating the pressure he applies to the machine.

It is obvious that a machine constructed in accordance with the principles involved in this invention and the structure disclosed by way of illustration, results in a neat, compact and portable machine which is sanitary and substantially fool-proof, as well as being very accessible for repairs and cleansing purposes. It is to be noted that if it is desired to remove any of the cutters it is merely necessary to pull the cutters loose from their spring retainers, however it is advisable to align the holes in straps 18 and insert pin 22 through from the front of the machine whereby the mechanism is rigidly locked and the cutters may be readily withdrawn and replaced at will. It is also to be noted that the entire machine is readily disassembled by removing the side and end plates if so desired.

It will be understood that various changes in the details and arrangements of parts herein described and illustrated for the purpose of explaining the nature of this invention may be made by those skilled in the art within the principle and scope of the invention as expressed in the appended claims.

We claim:

1. A meat tenderer comprising a frame, a plurality of cutters slidable in said frame, each cutter having on its lower edge a plurality of cutting blades, a shaft carried by said frame, means for rotating said shaft, means operated from the shaft for reciprocating the cutters in said frame whereby a steak over which the frame is moved will be repeatedly pierced by the blades on the cutters and means detachably securing said cutters to said latter means.

2. A meat tenderer comprising a frame, a plurality of cutters slidable in said frame, each cutter having on its lower edge a plurality of cutting blades, a shaft carried by said frame, means mounted on said frame for rotating the shaft, a plurality of eccentric cams secured on said shaft, eccentric straps surrounding said cams and means for releasably attaching said cutters to said straps.

3. A meat tenderer comprising a frame including two end plates, a plurality of cutters slidable in said frame, each cutter having on its lower edge a plurality of cutting blades, a shaft rotatably mounted in said frame, a motor secured to one of said end plates for rotating said shaft, a plurality of eccentric cams secured on said shaft, eccentric straps surrounding said cam and connections between said straps and said cutters.

4. A meat tenderer comprising a frame, a plurality of cutters slidable in said frame, each cutter having on its lower edge a plurality of cutting blades, a shaft carried by said frame, means for rotating said shaft, a plurality of eccentric cams secured on said shaft, eccentric straps surrounding said cams and connections between said cutters and said eccentric straps, and means for locking said eccentric straps.

5. A meat tenderer comprising a frame, a plurality of cutters slidable in said frame, each cutter having on its lower edge a plurality of cutting blades, a shaft carried by said frame, means for rotating said shaft, a plurality of eccentric cams secured on said shaft, eccentric straps surrounding said cams, means for releasably connecting said cutters to said straps and means for locking said straps.

6. A meat tenderer comprising a frame, a plurality of cutters slidable in said frame, each cutter having on its lower edge a plurality of cutting blades, a shaft carried by said frame, means for rotating said shaft, a plurality of eccentric cams secured on said shaft, a plurality of eccentric straps surrounding said cams, springs secured to said straps for engaging said cutters to releasably connect said cutters to said straps.

7. A meat tenderer comprising a frame, a plurality of cutters slidable in said frame, each cutter having on its lower edge a plurality of cutting blades, a shaft carried by said frame, means mounted on said frame for rotating said shaft, a plurality of eccentric cams secured on said shaft, a plurality of eccentric straps surrounding said cams, springs secured to said straps for engaging said cutters to releasably connect said cutters to said straps.

In witness whereof, we hereunto subscribe our signatures.

EZEKIEL GUGGENHEIM.
HERBERT W. SPELLMAN.